April 12, 1932. E. H. JOLLEY 1,853,060
REFRIGERATING DEVICE
Filed July 17, 1930 2 Sheets-Sheet 1
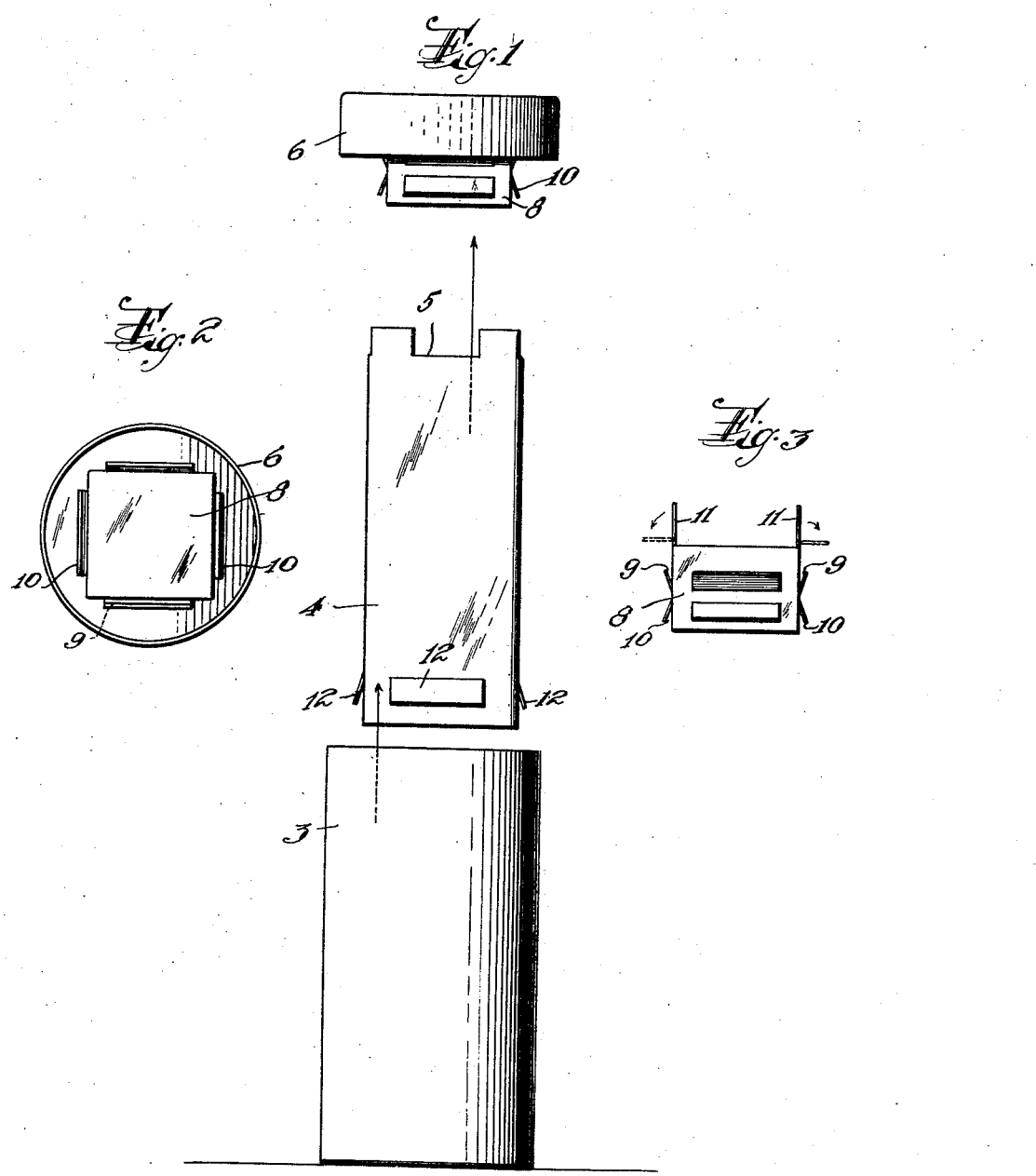
INVENTOR
Edward H. Jolley
BY
Frak C. Fischer
ATTORNEY April 12, 1932.  E. H. JOLLEY  1,853,060
REFRIGERATING DEVICE
Filed July 17, 1930  2 Sheets-Sheet 2
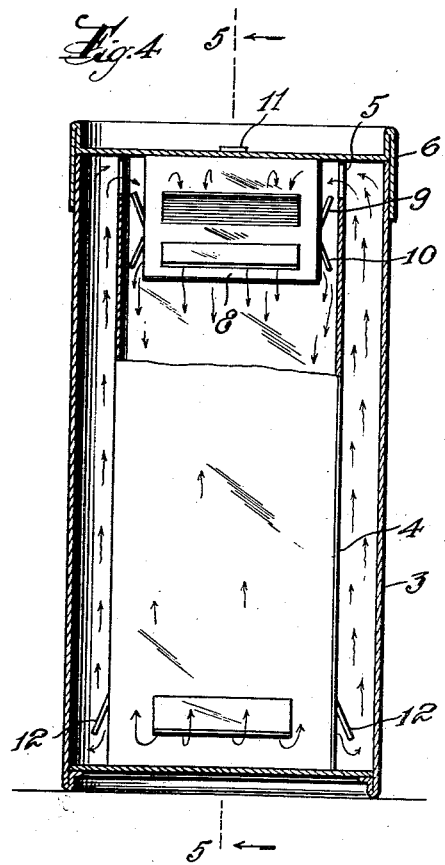
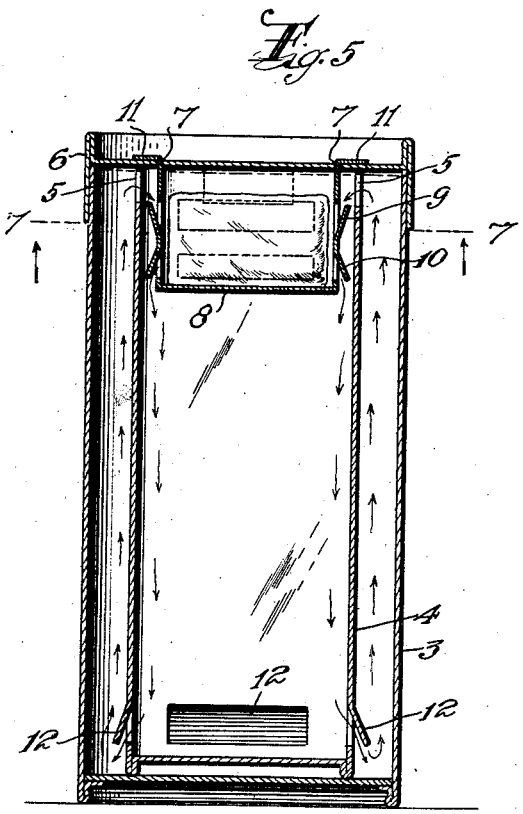
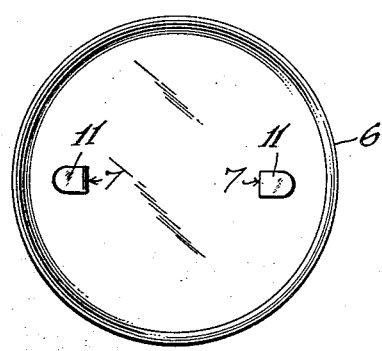
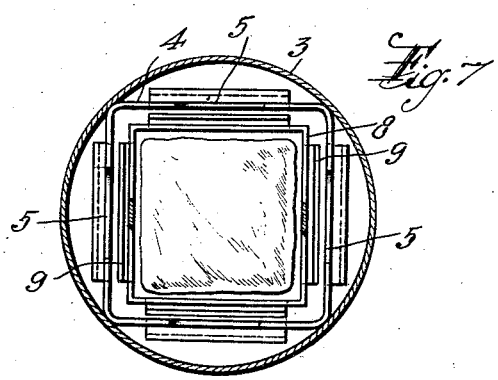
INVENTOR
Edward H. Jolley
BY
ATTORNEY Patented Apr. 12, 1932

1,853,060

UNITED STATES PATENT OFFICE

EDWARD H. JOLLEY, OF ELIZABETH, NEW JERSEY, ASSIGNOR OF ONE-HALF TO HARRY M. FRIEND, OF NEWARK, NEW JERSEY

REFRIGERATING DEVICE

Application filed July 17, 1930. Serial No. 468,653.

This invention relates to refrigerating devices, especially of a portable type, in which solidified carbon dioxide is preferably used as a refrigerant.

Heretofore, refrigerating devices of a portable type have comprised mainly a container having a compartment in which is contained a quantity of a refrigerant such as solidified carbon dioxide or common ice, the compartments being usually located at the bottom of the container.

Such refrigerating devices are found objectionable in that, when solidified carbon dioxide is used, the contents of the container are over-frozen; and the solidified carbon dioxide rapidly sublimes and within a short while entirely disappears. The arrangement, therefore, of the container was uneconomical, and also undesirable as a refrigerator because of the intense cooling effect.

It is an object of this invention to provide a refrigerating device in which a refrigerant such as solidified carbon dioxide is advantageously located, the device being provided also with means for regulating the rate of cooling of the contents of the container and also for maintaining an even temperature at all parts thereof.

A further object is the provision of a refrigerating device of the portable type which may be simply and inexpensively manufactured and economical in its operation.

These and other advantages, which will later appear, are accomplished by the simple and practical construction and arrangement of parts hereinafter described and exhibited in the accompanying drawings, forming part hereof, and in which:

Figure 1 represents an expanded view of the device.

Figure 2 represents a bottom view of the cover employed in the device.

Figure 3 represents a side view of a casing for holding a refrigerant.

Figure 4 represents a sectional view of the device completely assembled.

Figure 5 represents a sectional view taken on the line 5—5 of Figure 4.

Figure 6 represents a plan view of the cover.

Figure 7 represents a sectional view taken on the line 7—7 of Figure 5.

Referring to the drawings, a refrigerating device is shown to include a container having a body 3, preferably cylindrical in shape, and a cover 6. Positioned in the container is a second container 4, preferably in the shape of a parallelopiped. That is, the shape of the body 3 and container 4 should be different in order to provide space between the walls thereof.

The top edge of the container 4 has cut-out portions 5 and the lower part of the container 4 is provided with downwardly opening louvers 12; or cut-out portions may be provided at the lower part of the container 4 similar to the cut-outs 5.

The cover 6 is provided with a pair of apertures 7 which receive the prongs 11, the latter being integral with the casing 8 in which is contained a quantity of a refrigerant such as solidified carbon dioxide. The casing 8 is provided with the upwardly opening louvers 9 and downwardly opening louvers 10.

In operation when the device is assembled, the casing 8 extends down into the chamber 4 as shown in Figures 4 and 5. The articles to be refrigerated are carried in the container 4 and the cold gases pass downwardly through the louvers 10 to casing 8 through container 4 and out of the louvers 12. During its downward travel the air is somewhat heated and will rise in the space between the walls of the containers 3 and 4 and will enter the casing 8 through the upwardly opening louvers 9.

By means of the arrangement above described it will be seen that there has been provided an effective air circulating means for properly distributing the cold air uniformly throughout the container 4 and at the same time the dissipation of the solidified carbon dioxide from the casing 8 is moderate and not uneconomical.

By attaching the casing 8 directly to the cover, when the cover is removed it is not necessary to interfere with the casing 8 in order to have access to the contents of the container 4. Also the positioning of the refrigerant in the cover is highly desirable as carbon dioxide gas is heavier than air and also the natural tendency of cold air is to descend, and by this arrangement effective refrigeration is obtained.

The device herein disclosed is highly desirable for use in situations in which perishable articles must be carried about, for example the vending of ice cream, etc. at open air gatherings.

While the above description specifically sets forth the use of solidified carbon dioxide, it is obvious that the arrangement herein disclosed may be equally as well applied to the use of common ice.

The body 3 and its cover may be made of metal, cardboard, or other substances. Preferably, body 3 is formed from a sheet of insulating material comprising two plys of chip board, one ply of an insulating substance such as balsam wool, three plys of chip board, and one ply of a lining comprising asphalt and a waterproof vegetable parchment. The balsam wool gives a dead air space and is an effective heat insulator. The container 4 and casing 8 may be made of cardboard or metal.

The foregoing disclosure is to be regarded as descriptive and illustrative only, and not as restrictive or limitative of the invention of which obviously an embodiment may be constructed including many modifications without departing from the general scope herein indicated and denoted in the appended claims.

Having thus described my invention, what I claim as new and desire to secure by Letters Patent, is:

1. A refrigerating device comprising a body and a cover therefor, a container positioned in the body, said container having openings in its side walls near the top and bottom thereof, a refrigerant carrying casing having upwardly and downwardly opening louvers, and means for attaching the casing to the cover.

2. In a refrigerating device, a container having a body and a cover therefor, and a referigerant carrying casing attached to the cover, said casing having upwardly and downwardly opening louvers.

3. In a refrigerating device, a body having a cover, a container carried in the body and spaced from the walls thereof, said container having openings in its side walls adjacent the upper and lower edges and means on the cover for carrying a refrigerant.

This specification signed this 15th day of July, 1930.

EDWARD H. JOLLEY.